United States Patent

Adams

[15] 3,640,408
[45] Feb. 8, 1972

[54] PART-REMOVING MECHANISM FOR REMOVING CONTAINER PARTS AND THE LIKE FROM NESTED STACKS OF PARTS

[72] Inventor: Gary A. Adams, Beaverton, Mich.
[73] Assignee: Koehring Company, Milwaukee, Wis.
[22] Filed: June 9, 1969
[21] Appl. No.: 831,552

[52] U.S. Cl. ..................214/8.5 A, 214/1 BA, 214/8.5 C, 214/8.5 D, 221/93, 294/99
[51] Int. Cl. ..................................................B65g 59/10
[58] Field of Search..................214/8.5, 8.5 A, 8.5 D, 8.5 C, 214/8.5 K, 1 B; 221/93, 211, 220; 294/90, 93, 99

[56] References Cited

UNITED STATES PATENTS

| | | | |
|---|---|---|---|
| 3,511,395 | 5/1970 | Brown | 214/8.5 D X |
| 157,165 | 11/1874 | Ellsworth | 294/83 X |
| 1,126,194 | 1/1915 | Graham | 214/8.5 K UX |
| 1,737,784 | 12/1929 | Cherry | 214/8.5 K UX |
| 3,186,593 | 6/1965 | Miotke | 294/19.1 X |
| 3,415,388 | 12/1968 | Horlein | 214/8.5 D |

FOREIGN PATENTS OR APPLICATIONS

| | | | |
|---|---|---|---|
| 73,387 | 6/1960 | France | 214/8.5 K |

*Primary Examiner*—Gerald M. Forlenza
*Assistant Examiner*—George F. Abraham
*Attorney*—Learman & McCulloch

[57] ABSTRACT

Continuously moving transfer mechanism having pairs of container part-gripping members are movable in toward the ends of endmost container parts which are supported, for example, in side-by-side nested stacks and thence are moved endwisely away in a linear path of travel and to a remote location where the container parts are released from the gripping members. One gripping member comprises a plug which is shaped to enter a container part having a radially inwardly extending lip and each plug has a rib for engaging behind the lip of the container part to pull the container part outwardly. The other container-gripping part comprises a suction cup. Restraining members are provided for insuring that only the endmost container part in each stack of parts is removed by a set of gripping members.

18 Claims, 9 Drawing Figures

INVENTOR.
GARY A. ADAMS

BY

Learman & McCulloch

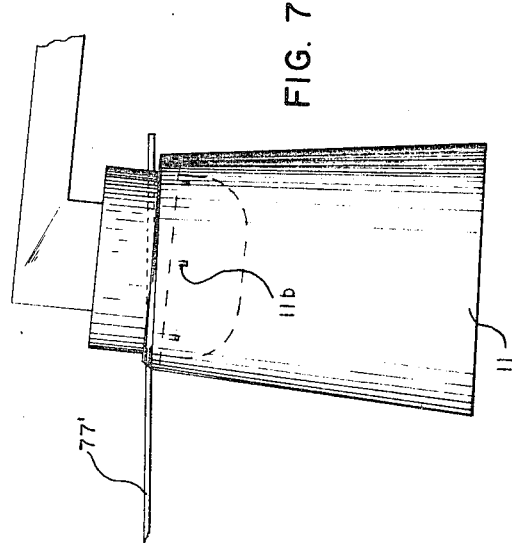
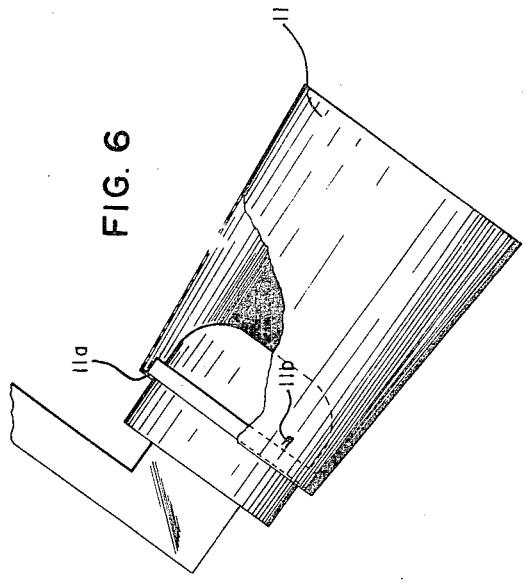

PART-REMOVING MECHANISM FOR REMOVING CONTAINER PARTS AND THE LIKE FROM NESTED STACKS OF PARTS

The present invention is directed particularly to transfer apparatus for individually removing container parts from the ends of side-by-side stacks of such parts and delivering them to a remote location. More specifically, the invention relates to pairs of differential pressure formed, thin walled, synthetic plastic container parts which may be friction welded together to form containers for foods such as yogurt. Specifically, such containers comprise cup-shaped bottom parts having end walls which may be gripped by a suction cup and frustoconical tubular body parts, open at both ends, which have at their ends of reduced diameter inwardly extending deformable lips. While it is not important to the present invention, the bottom parts are shaped to be received within the larger diameter portion of the frustoconical parts and friction welded in position in a manner similar to the manner described in the present assignee's U.S. Pat. No. 3,297,504, to form bottoms therefore. The lips on the opposite ends of the frustoconical parts which have been mentioned are utilized in securing caps in place to seal the tops of the containers once the food product has been supplied thereto. The mechanism which will be described is similar in many respects to the mechanism claimed in copending application Ser. No. 729,056, filed May 14, 1968, and entitled Mechanism For Removing Containers From Mandrels, which application is incorporated herein by reference.

One of the prime objects of the present invention is to provide take away mechanism capable of simultaneously removing container parts from side-by-side plural stacks of such parts and transferring them in sets to discharge conveyor means so that they may be moved to a machine such as a friction-welding machine for joining them together.

Another object of the invention is to provide apparatus of the character described with mechanism which insures that only one part at a time will be removed from each stack.

Still another object of the invention is to provide continuously driven transfer means which is operative with continuously growing stacks of container parts.

Other objects and advantages of the invention will be pointed out specifically or will become apparent from the following description when it is considered in conjunction with the appended claims and the accompanying drawings in which:

FIG. 2A is a schematic side elevational view of the conveyor for supplying parts to one of the stacks;

FIG. 6 is an enlarged view of the parts shown in the circles in FIG. 1 to better illustrate the configuration of the one end of one of the container parts;

FIG. 7 is an enlarged side elevational view illustrating the manner in which the parts are stripped from the one form of gripping member.

FIG. 8 is an enlarged view taken of circled parts in FIG. 2A.

Referring now more particularly to the accompanying drawings wherein a preferred embodiment of the invention only has been shown, a letter F generally refers to the frame of the machine on which the container-part-removing mechanism of the present invention is supported. As noted the mechanism is capable of removing two dissimilar container parts from side-by-side stacks of the two dissimilar parts.

Figure 4:
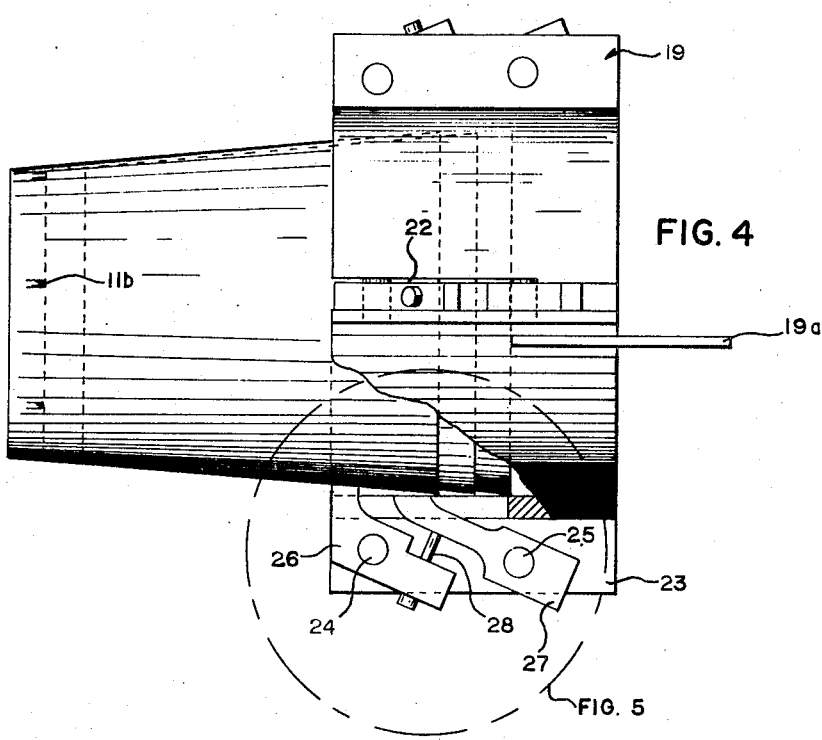
FIG. 4 is an enlarged, side elevational view illustrating mechanism which is employed to hold a part immediately behind so that it is not removed at the time the endmost part is being removed from the stack, and illustrating the retaining part in an nonengaged position.

As FIGS. 6 and 7 particularly indicate, one of the parts which is to be removed individually from a horizontal stack 10 of such parts comprises a hollow frustoconical plastic shell or part generally designated 11 which is open at both ends and has, at its end of smallest diameter, an inwardly extending lip portion 11a. Provided within the parts 11, spaced slightly from the lip portions 11a thereof, are stacking indentations or nibs 11b which control the nesting of the parts 11 and prevent them from nesting too tightly. The parts 11 comprise the upper parts of container bodies to be assembled and are provided to the mechanism which forms the subject matter of the present invention in a stack 10 from suitable differential pressure-forming and trim press machinery. As FIG. 4 particularly indicates, the stacking of the cups 11 is controlled by the stacking nibs or lugs 11b which project into the interior of the parts 11 and are formed in the sidewalls thereof in circumferentially spaced relationship.

Also provided in another stack generally designated 12 (see FIGS. 2A and 8) are container bottom parts, generally designated 13. The cup-shaped bottom parts 13 may be joined to the upper parts 11 in a friction-welding machine which is described in my copending application entitled, Spin Welding Holder and Loading Apparatus, in the manner indicated therein. The present mechanism is designed to remove an individual upper part 11 and an individual bottom part 13 from the stacks 10 and 12, respectively, and deliver them to the friction-welding apparatus mentioned. In so doing, the mechanism must orient the parts 11 and 13 removed from the horizontal position in which they are stacked to a vertical position in which they are received on a discharge conveyor.

Figure 1:
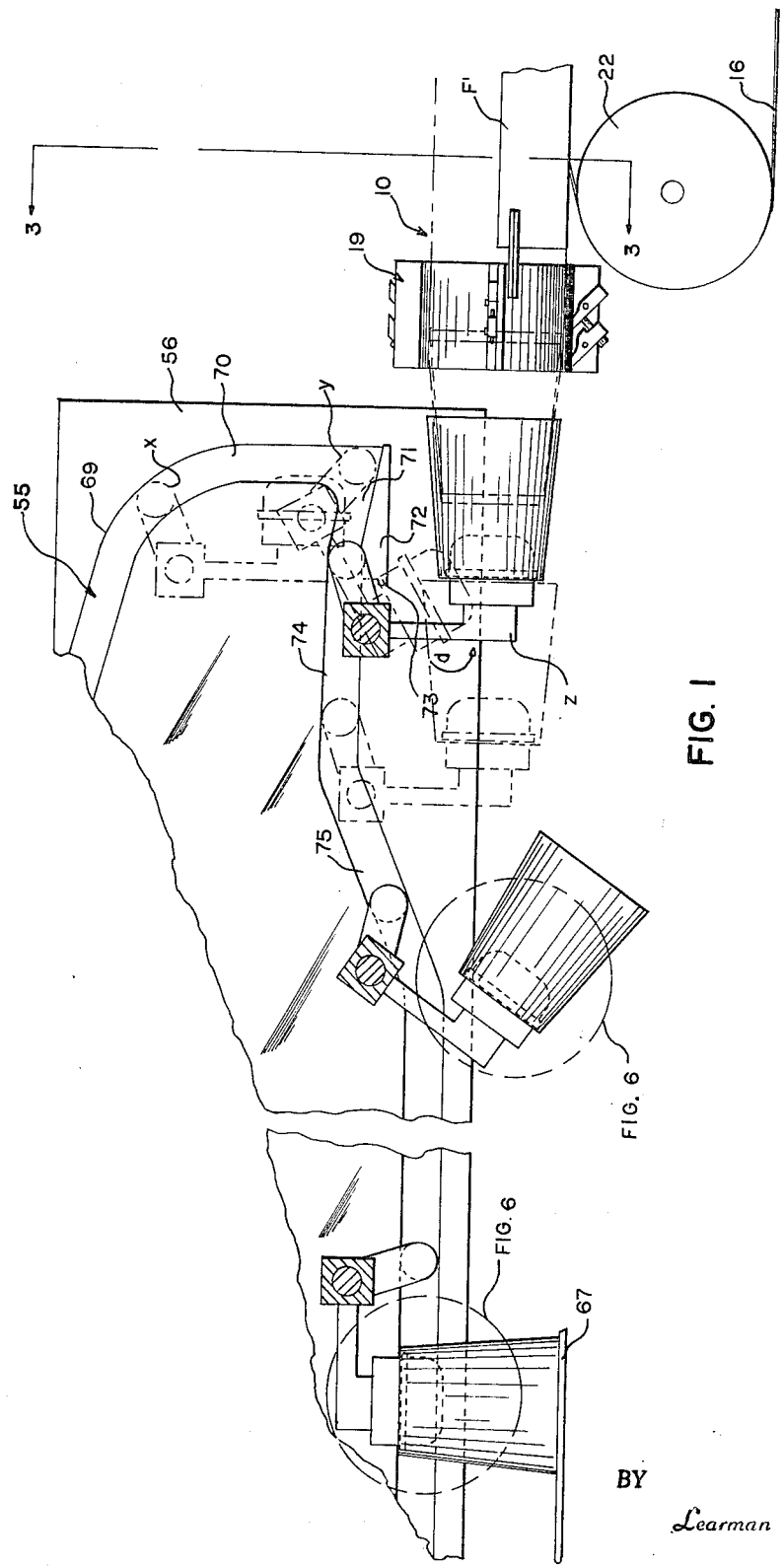
FIG. 1 is a schematic, side elevational view illustrating various positions of the container part gripper assemblies and particularly the part-entering gripping members for removing parts from one of the side-by-side stacks, this view being taken on line 1—1 of FIG. 3 and illustrating the progressive positions thereof.
Figure 2:
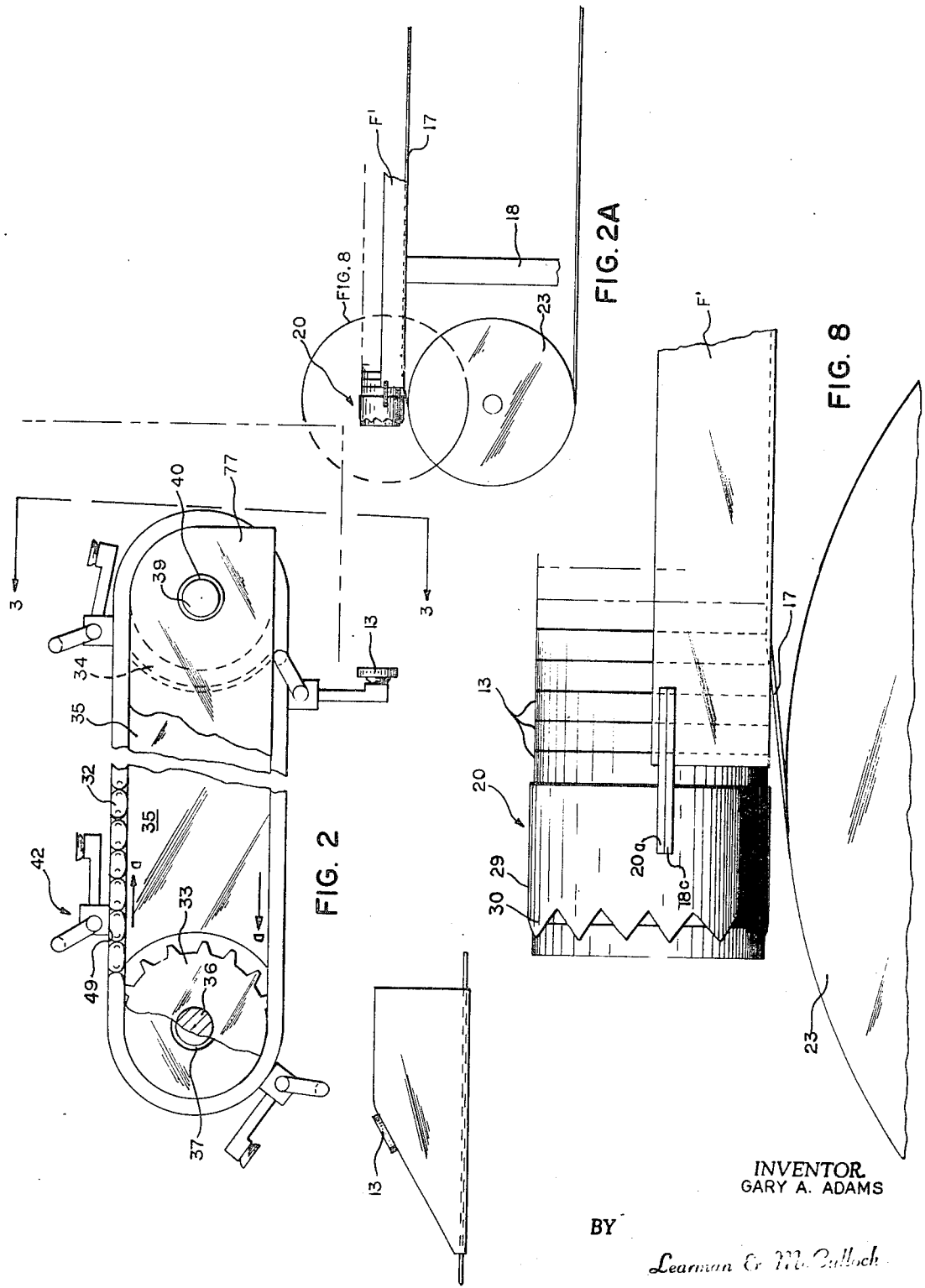
FIG. 2 is a similar view of the transfer assembly only illustrating various progressive positions of the container removing suction-cup-gripping members for simultaneously removing parts from another stack, the view being taken on the line 2—2 of FIG. 3.
Figure 3:
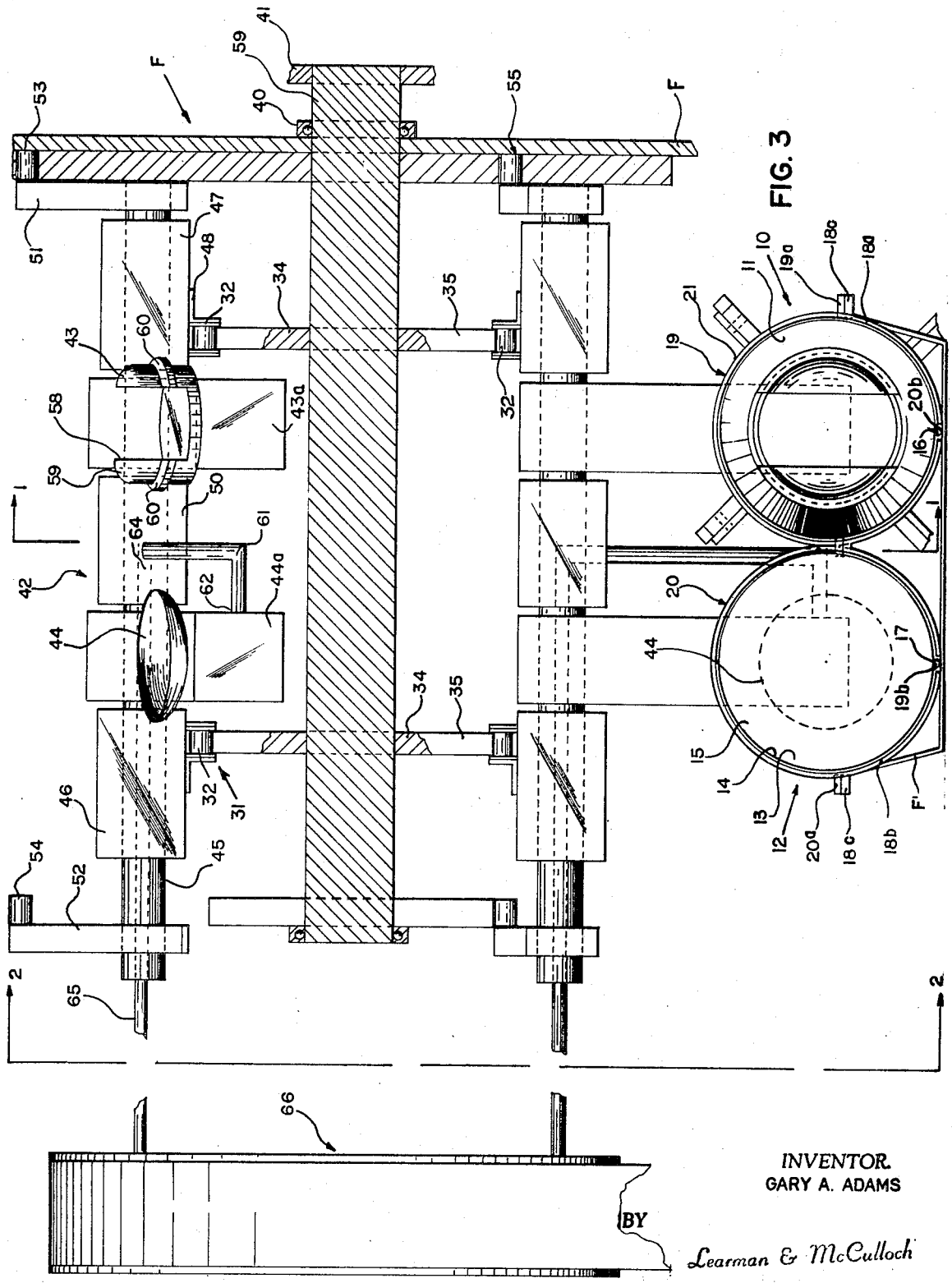
FIG. 3 is a considerably enlarged, transverse sectional view taken on the line 3—3 of FIG. 1 and FIG. 2 and particularly illustrating the construction of both types of part-removing assemblies.

As FIG. 3 particularly indicates, each bottom part 13 includes an end wall 14 and a peripheral sidewall 15 which fits the interior of the enlarged end portion of container part 11. The two separate stacks of parts 10 and 12 are delivered by a pair of continuously driven endless members or belts 16 and 17, respectively (see FIGS. 1-3), via chutes 18a and 18b to removal cages which separately receive the stacks of parts 11 and 13. It is to be understood that the conveyors 16 and 17, which may comprise endless flexible spring members traveling in slots 19b and 20b provided in the chutes 18a and 18b are trained around pulley members 22 and 23, respectively, at one end and around driven pulleys (not shown) at their opposite ends. The double-trough housing, forming chutes 18a and 18b, is stationarily supported by suitable framework F' which supports the upper runs of belts 16 and 17. The belts 16 and 17 are sufficiently engaged with the container parts 11 and 13 that they continuously urge and move them endwisely to the left in FIGS. 1 and 2A.

Provided at the discharge end of the trough structure F' are a pair of mount flanges 18c to which are welded a pair of discharge ring cage sections generally designated 19 and 20, respectively, for the stacks 10 and 12, ring sections 19 and 20, respectively having flanges 19a and 20a, which may be welded to the flange portions 18c. The cage member generally designated 19, as particularly illustrated in FIGS. 3 and 4, comprises a cylindrical sleeve member 21 having an internal diameter only very slightly larger than the maximum diameter of the parts 11.

Figure 5:
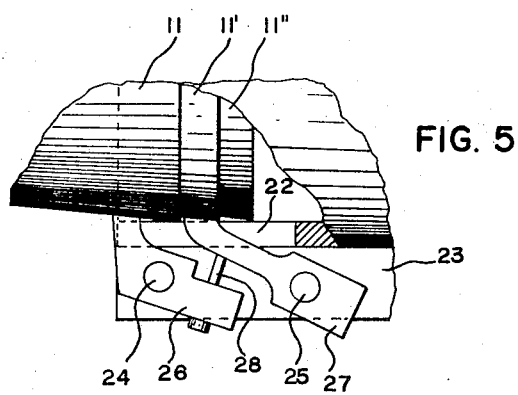
FIG. 5 is a similar fragmentary view of the mechanism shown in the circle identified at 5 in FIG. 4, but showing the retaining part in engaged position.

Cut into the discharge end of sleeve 21 are diametrically opposed slots 22, as shown, and extending radially adjacent the slots 22 are mount plates 23 which each pivotally mount, as at 24 and 25, respectively, a pair of jaw members 26 and 27. The jaws 26, which may be termed actuator jaws or levers, mount pins 28 which project inwardly to engage the jaws 27 and, as illustrated in FIG. 5, when the jaws 26 are pivoted in a counterclockwise position, operate to pivot the restraining or gripping jaws 27 inwardly in a clockwise direction. When a container 11 which is withdrawn in a manner which will later be described, is moved outwardly in the ring assembly 19, the jaws 26 are pivoted outwardly by the increasing diameter of the container part 11 which forces the gripping jaws 27 inwardly to grip and hold the next part in the stack so that only one container part 11 may be withdrawn at a time.

The discharge cage assembly 20 for the stack 12 of container bottom parts 13 comprises a cylindrical ring or sleeve member 29 having a serrated edge which provides a plurality of holding fingers 30 (see FIG. 8). The fingers 30 are formed of sufficiently light-gage metal that they can be bent inwardly sufficiently to grip the parts when the endmost bottom part 12 is withdrawn in a manner to be presently described, the grip of fingers 30 being sufficient to prevent the next part in the stack from also being withdrawn from the ring assembly 20.

As FIGS. 2 and 3 particularly indicate, the container-part-removing mechanism includes an endless transfer assembly, generally designated 31, which includes a pair of transversely spaced-apart chains 32, trained around sprockets 33 and 34. Guides 35 are provided between the sprockets 33 and 34 at each side of the machine as indicated. The rear shaft 36 on which the pulleys 33 are fixed, may comprise an idler shaft journaled in suitable bearings 37. The front shaft 39, which is driven, may be journaled by suitable bearings 40. Mounted on one end of shaft 39 is a drive sprocket 41 which is connected via a chain (not shown) to a suitable drive motor (not shown) in the usual manner.

Mounted between the transversely spaced drive chains 32 which are driven in the direction "a" shown in FIG. 2, are a series of spaced apart container part take away assemblies generally designated 42. Each assembly 42 includes a take away part entering plug member 43 for removing a container part 11 and a container part take away suction cup member 44 for removing a container bottom part 13. Each of the part removal members 43 and 44 is mounted on a block 43a and 44a respectively, fixed to a rocker shaft 45 which also pivotally mounts blocks 46 and 47, secured by means of angle members 48 to certain links 49 of the conventional roller chains 32 which carry assemblies 42. Also a vacuum line holder block 50 (see FIG. 3) which will later be mentioned again is fixed on each shaft 45. Keyed on the outboard ends of shaft 45 are follower arms 51 and 52 which respectively carry follower rollers 53 and 54. The follower rollers 53 are adapted to engage within a cam groove, generally designated 55, provided in a cam-track plate 56 which will also later be described in more detail.

Each of the part removal members 43, which may suitably be formed of a long-wearing material such as nylon, is grooved or bifurcated as at 58 to provide projecting flexible fingers 59. Flange portions 60 provided on each of the fingers 59 move inwardly into a part 11 to engage behind the lip 11a of each part 11 and, when moved outwardly, draw the part 11 outwardly. The rib or flange portions 60 are projected radially sufficiently so that they deform the flange 11a when they are moved inwardly into a part 11 and the lip 11a then is free to expand ahead of the ribs 61 when entry has been effected. The movement of the part removal members 43 into gripping position is particularly illustrated in FIG. 1, wherein various positions of the members 43 are depicted.

Each removal member 44 comprises a suction cup member connected via line 61 with the block 50, there being a port 62, provided in the block 44a on which the suction cup 44 is mounted, leading to the cup 44. The block 50 has a passage 64 leading to a line 65 which extends through the hollow rocker shaft 45 to a suction control valve assembly generally designated 66. The suction control valve assembly 66 is of the type described in my aforementioned application, Ser. No. 729,056, and will not be further described. It is sufficient for purposes of the present application that suction force be applied via cup 44 at the time it is brought into engagement with the end of a part 13 and that the suction force continues to be applied until the suction assembly 44 is ready to discharge a part 13 to an endless discharge conveyor 67. Any conventional vacuum valve and vacuum pump may be used. The member 43 also discharges parts 11 to the endless conveyor 67 in a manner which will be described.

As each rocker shaft 45 and part removal assembly 42 moves forwardly toward the stacks of cups 10 and 12 in the direction a the follower 53 moves into the cam track 55 which includes a curvilinear upper portion 69, a vertical portion 70, a slightly upwardly and rearwardly inclined portion 71 formed on one side by a resilient pad 72 secured in a recess 73, a horizontal part-denesting portion 74, a downwardly and rearwardly inclined portion 75, a rearwardly extending horizontal portion 76, and a rearmost curvilinear portion concentric with shaft 36 and extending around sprockets 33. The cam track 56 may be stationarily fixed to the frame F in any suitable manner. Suction forces will be applied to each suction cup assembly 44 during only a portion of its travel, during a period when it first engages a part 13 and continuing until the part 13 moves over the discharge conveyor 67.

Mounted on the opposite side of the mechanism from the cam track 56 is a stabilizer guide 77 which corresponds to the portion 74 of cam track 55 and is effective to stabilize the follower roller 54 as the parts 11 and 13 are being moved endwisely in a linear path away from the stacks 10 and 12.

THE OPERATION

In operation, container parts 11 and 13 are continuously being supplied to the front end of stacks 10 and 12 by the conveyor belts 16 and 17, respectively, so that the stacks 10 and 12 are being continuously supplied with parts at about the same rate that parts are being removed. As FIGS. 1 and 2 particularly indicate, as the particular removal assembly 42 mounted on a rock shaft 45 travels down the cam portion 69, it is in substantially in the position shown at "x" in FIG. 1, and as it continues to travel is maintained in a position in which it clears the parts halted at the rear ends of stacks 10 and 12. When the roller 53 abruptly meets the cushion pad 72 at position "y," the roller 53 is prevented from traveling further downwardly and moves upwardly along ramp surface 71 so that the members 43 and 44 are swung downwardly, the suction cup 44 to engate the end wall of the rearmost cup 13 in the stack 12 and the member 43 to enter the rearmost part 11 in the stack 10.

As FIG. 3 particularly indicates, the part 43 slightly leads the suction cup 44 because the fingers 59 must enter the part 11 sufficiently so that the ribs 60 deform the lip 11a and engage behind it. When the roller 53 reaches the position "z" at the head of cam-track portion 74, movement of the chains 32 has completely swung members 43 and 44 counterclockwisely in the direction "d" to cause the suction cup member 44 and member 43 to be now substantially axially aligned with the stacks 10 and 12. The ramp 72 is responsible, together with the chains 32, for swinging the members 43 and 44 sharply down in the manner indicated.

At this time the jaws 26 and 27 are in the position indicated in FIG. 5 so that inward movement of the endmost part 11 is prevented at the time part 43 enters. Thereafter, when part 43 draws the endmost part 11 outwardly, the next successive part 11' in FIG. 5 is prevented from moving outwardly because it is radially gripped at diametrically opposite locations by the jaws 27. Once an endmost cup 11 has been withdrawn, the continuing cup-advancing movement of the endless conveyor member 16 will move the stack of parts 11 in an outward direction to release the jaws 26, and thereby the jaws 27, so that the next endmost part 11' passes beyond the jaws 27 before it once again spreads jaws 26 to grip the next endmost part 11''. Of course, at the time suction cup 44 first engages the endmost part 13, valve 66 is communicating it with a source of suction, such as any conventional suction pump, so that at the time member 43 is withdrawing a part 11, suction cup 44 is simultaneously withdrawing a part 13.

By the time the follower roller 53 reaches the inclined cam portion 75, the parts 11 and 13 have been withdrawn completely from the stack and the roller 53 then travels downwardly in the inclined portion 75 to pivot the assembly 42 in a clockwise direction as indicated. When the roller 53 reaches the cam portion 76 the container parts 11 and 13 have been pivoted 90° to a position in which they may be deposited on the discharge conveyor 67 respectively. At this point the valve 66 discommunicates the suction member 44 from the vacuum source so that vacuum cup 44 releases the part 13 to the discharge conveyor 67. Also at this time, a stationary stripper finger 77' (see FIG. 7) fixed on a suitable bracket provided on frame F has entered the groove 59 provided in the container part remover member 43 and, as the portion of chains 32 carrying the particular part remover assembly 42 commences to move upwardly around the sprocket 33, operates to strip the part 11 therefrom. The machine continues to operate in the manner which has been described, with successive part removal assemblies 42 each operating to remove both a part 11 and a part 13.

The foregoing description is intended to be illustrative rather than definitive and the invention is defined in the appended claims.

1. Mechanism for successively removing the endmost container parts from a longitudinally extending stack of container parts comprising: support means for supporting said stack of container parts; transfer conveyor means having at least one container-part-gripping member movable in a path of travel toward and thence endwisely away from the support means and said stack of container parts thereon in a substantially linear direction generally aligned with the axis of the stack for removing the endmost container part endwisely from said stack and transferring it to a remote location; means comprising circumferentially spaced pairs of pivotally mounted jaws on said support means for restraining all parts in each stack save the endmost part so that only one part at a time is removed from the stack; one jaw of each pair comprising a camming jaw responsive to endwise movement of said endmost part with said gripping member to move the other jaw into radially inwardly disposed restraining position to restrain the next endmost part so that only the endmost container part is removed from said stack.

2. The combination defined in claim 1 in which said other jaws are mounted in diametrically opposed position and radial outward-pivoting movement of said camming jaws moves said other jaws radially inwardly into gripping position.

3. Mechanism for removing a hollow container part having a peripheral sidewall and a radially expandable inwardly turned lip at one end thereof from a support, such as a longitudinally extending stack of container parts, said mechanism comprising:
support means for said container part;
transfer conveyor means having at least one container-part-gripping member movable in a path of travel toward and thence away from the support means in a substantially linear direction generally aligned with the axis of the container part for removing the endmost container part endwisely from said support means and transferring it to a remote location;
said container-gripping member comprising a plug of a size to move into said one end of the container part, said plug having a rib part projecting sufficiently to spread said lip and then engage behind it to pull the container part away from said support means endwisely in said linear direction.

4. The combination defined in claim 3 wherein said plug includes a bifurcated portion; and stripper bar means located in the path of travel of said plug at said remote location enters said bifurcated portion to strip a container part therefrom.

5. Mechanism for removing the endmost container parts from a pair of longitudinally extending side-by-side stacks of container parts; the container parts in one stack including end closure walls in the forward ends thereof and the container parts in the other stack being open at their forward ends; said mechanism comprising:
support means for supporting said pair of longitudinally extending side-by-side stacks of container parts;
transfer conveyor means having transversely spaced apart container-part-gripping members movable in paths of travel toward and thence endwisely away from said support means and said stacks of container parts in substantially linear paths of travel generally aligned with the axes of the stacks of container parts for removing the endmost container parts endwisely from the stacks and transferring them to a remote location; one of said transversely spaced apart gripping members comprising suction exerting means engageable with the end wall of the endmost container part in said one stack; the other of said transversely spaced-apart gripping members comprising a part-entering plug member for projecting into said forward end of the endmost container part in the other stack to grip the endmost container part in said other stack.

6. The combination defined in claim 5 wherein said one container-gripping member comprises a suction cup engageable with the end wall of an endmost container part.

7. The combination defined in claim 6 in which cam-track means guides the travel of said container-part-gripping members; said members being mounted on a shaft having a follower arm thereon with a follower riding in said cam-track means.

8. The combination defined in claim 7 in which a plurality of said shafts are carried between continuously driven endless members for successively removing plural container parts; said cam-track means pivoting said shafts to swing said part-gripping members downwardly and endwisely toward said container parts while said shafts are moved away from said stacks by said endless members; and said plug-gripping members are angularly positioned on said shafts to slightly lead said suction-cup-gripping members.

9. Mechanism as set forth in claim 5 wherein restraining means are provided adjacent each stack for insuring that only the endmost container part in each stack of parts is removed by the respective gripping members.

10. Mechanism as set forth in claim 5 wherein said plug member and said suction-creating means are positioned in side-by-side relation; and means for simultaneously moving said plug member and said suction-creating means to container-part-engaging positions.

11. Mechanism for successively removing the endmost container parts from longitudinally extending side-by-side stacks of container parts: support means for supporting said longitudinally extending, side-by-side stacks of container parts; transfer conveyor means movable in a path of travel endwisely away from said support means and the stacks of container parts thereon, transversely spaced container part-gripping means being mounted on said conveyor means for relative movement with the conveyor means from remote positions endwisely toward and into engagement with the endmost container parts on said side-by-side stacks; and means for moving said transversely spaced gripping means into container-part-engaging positions while said conveyor means is traveling endwisely away from the support means and the stacks of container parts thereon; said transfer conveyor means moving said transversely spaced gripping means away from said support means in substantially linear paths of travel away from said support means generally endwisely aligned with the stacks of container parts thereon to remove the endmost container parts endwisely from the stacks and transfer them to a remote location.

12. Mechanism for handling container parts comprising: support means for supporting longitudinally extending side-by-side stacks of container parts; endless conveyor member mechanism having an end run portion adjacent the support means and a longitudinal run portion extending generally parallel with the axes of the container part stacks and movable in a direction away from the support means and the container part stacks thereon; transversely spaced container-part-gripping means swingably mounted on said mechanism; and means for swinging said transversely spaced gripping means toward and into general alignment with the axes of said stacks in container-part-gripping positions; said longitudinal run portion moving said transversely spaced gripping means away from said support means in substantially linear paths of travel generally aligned with the axes of the stacks of container part to remove the endmost container parts endwisely from said stacks and transfer them to remote locations.

13. Mechanism for simultaneously handling a pair of container parts, one of said container parts including an end closure wall in the forward end thereof and the other container part being open at its forward end, said mechanism comprising:

support means for supporting said pair of container parts in side-by-side relation;

transfer conveyor means having transversely spaced-apart container-part-gripping members movable in paths of travel toward and thence endwisely away from the support means in substantially linear paths of travel generally aligned with the axes of the container parts for simultaneously removing the side-by-side container parts endwisely from the support means and transferring them to a remote location; one of said transversely spaced-apart gripping members comprising suction exerting means engageable with the end wall of said one part; the other of said transversely spaced-apart gripping members comprising suction-exerting means engageable with the end wall of said one part; the other of said transversely spaced-apart gripping members comprising a part-entering plug member for projecting into said forward end of said other container part to grip the other container part on said support means.

14. Mechanism as set forth in claim 13 wherein said transversely spaced container-part-gripping means are mounted on said conveyor means for relative movement therewith from remote positions endwisely toward and into engagement with said side-by-side container parts; and means for simultaneously moving said transversely spaced gripping means into container-engaging positions while said conveyor means is traveling away from the support means.

15. Mechanism as set forth in claim 13 wherein said transfer conveyor means comprises an endless conveyor member mechanism having an end run portion adjacent said support means and a longitudinal run portion extending generally parallel with the axes of the container parts and movable in a direction away from the support means and the container parts thereon; said transversely spaced container-part-gripping means swingably mounted on said endless mechanism; and means for swinging said transversely spaced gripping means toward and into general alignment with the axes of the container parts in container-part-gripping positions; said longitudinal run portion simultaneously moving said transversely spaced gripping means away from the support means in said linear paths.

16. Mechanism for removing the endmost container part from a longitudinally extending stack of container parts comprising: support means for said stack of container parts out which said container parts pass; transfer conveyor means having at least one container-part-gripping member movable in a path of travel toward and thence endwisely away from the support means and said stack of container parts thereon in a substantially linear direction generally aligned with the axis of the stack for removing the endmost container part endwisely from said stack and transferring it to a remote location; grasping means radially movable on the support means between a radially outer inoperative position and a radially inner grasping position to grasp at least one of said container parts in said stack to restrain its endwise movement; and means having a part movable radially outwardly in response to endwise movement of said endmost part with said gripping member and operable in response to said radial outward movement to move said grasping means radially inwardly to said grasping position to restrain endwise movement of all parts in each stack save the endmost part so that only the endmost part is removed from said stack.

17. Mechanism for removing the endmost container parts from a pair of longitudinally extending side-by-side stacks of container parts; the container parts in one stack including end closure walls in the forward ends thereof and the container parts in the other stack including perimetrical sidewalls and being open at their forward ends; said mechanism comprising:

support means for supporting said pair of longitudinally extending side-by-side stacks of container parts;

transfer conveyor means having transversely spaced apart container-part-gripping members movable in paths of travel toward and thence endwisely away from said support means and said stacks of container parts in substantially linear paths of travel generally aligned with the axes of the stacks of container parts for removing the endmost container parts endwisely from the stacks and transferring them to a remote location; one of said transversely spaced-apart gripping members comprising suction-exerting means engageable with the end wall of the endmost container part in said one stack; the other of said transversely spaced-apart gripping members comprising container sidewall gripping means for gripping the perimetrical sidewall of the endmost container part in said other stack.

18. Mechanism as set forth in claim 17 wherein said sidewall gripping means includes part-entering means for projecting into said forward end of the endmost container part in the other stack to grip the endmost container part.

* * * * *